United States Patent [19]
Jang

[11] Patent Number: 5,882,273
[45] Date of Patent: Mar. 16, 1999

[54] HYDRAULIC CONTROL SYSTEM OF AUTOMATIC TRANSMISSION FOR AUTOMOTIVE VEHICLE

[75] Inventor: Jaeduk Jang, Kyungki-do, Rep. of Korea

[73] Assignee: Hyundai Motor Company, Seoul, Rep. of Korea

[21] Appl. No.: 911,698

[22] Filed: Aug. 15, 1997

[30] Foreign Application Priority Data

Aug. 30, 1996 [KR] Rep. of Korea ................. 1996 36764

[51] Int. Cl.$^6$ ................................................. F16H 61/06
[52] U.S. Cl. ........................................... 475/129; 477/152
[58] Field of Search ........................... 475/129; 477/150, 477/152

[56] References Cited

U.S. PATENT DOCUMENTS

| | | | |
|---|---|---|---|
| 3,656,372 | 4/1972 | Chana | 477/152 |
| 4,987,982 | 1/1991 | Yamaguchi | 477/152 |
| 5,393,273 | 2/1995 | Haka | 477/150 |

Primary Examiner—Dirk Wright

[57] ABSTRACT

A hydraulic control system for an automatic transmission used in a vehicle, the hydraulic control system includes a pressure regulating part for regulating hydraulic pressure generated from a hydraulic pump to constant line pressure, a manual valve selectively supplying hydraulic pressure to a drive pressure passage, a reverse pressure passage, and a first and a second speed pressure passage. A pressure control part supplies standard pressure to solenoid valves which are duty-controlled by a transmission control unit. The pressure control part has a solenoid supply valve. A damper clutch control part controls a damper clutch of a torque converter. A pressure distributing part distributes an appropriate amount of pressure to friction members, and has shift valves and clutch valves. A torque pressure generating part reduces the line pressure so that it can be used for initial shifting control. A pressure compensating device compensates hydraulic pressure by elastically storing the standard pressure when the hydraulic pressure fed to the torque pressure generating part, the pressure regulating part, and the damper clutch control part is reduced, the pressure compensating device being connected to the pressure control part.

4 Claims, 2 Drawing Sheets

HYDRAULIC CONTROL SYSTEM OF AUTOMATIC TRANSMISSION FOR AUTOMOTIVE VEHICLE

FIELD OF THE INVENTION

The present invention relates to a hydraulic control system of an automatic transmission for an automotive vehicle, and in particular to a hydraulic control system which can compensate for a hydraulic change caused by an operation of solenoid valves, which are duty-controlled or ON/OFF controlled for shift control.

BACKGROUND OF THE INVENTION

A conventional vehicle automatic transmission has a torque converter and a multiple stage transmission gear mechanism connected with the torque converter. The gear mechanism includes hydraulically applied friction members for selecting one of the gear ratios of the transmission gear mechanism in accordance with vehicle operating conditions. A hydraulic pump produces pressure required to operate the friction members and control valves.

The friction members are controlled by a hydraulic control system. The hydraulic control system comprises pressure regulating means for regulating hydraulic pressure generated from the hydraulic pump, hydraulic control means for controlling shift shock and shift-responsiveness, damper clutch control means for controlling a damper clutch of the torque converter, and hydraulic pressure supplying means for supplying hydraulic pressure to each friction member.

The hydraulic control means controls supply line pressure acting on each friction member, torque converter supply pressure, solenoid valve supply pressure. These pressures substantially affect the smoothness of shifting.

Therefore, there is provided a conventional hydraulic control system which initially feeds torque pressure to the friction members and then replaces the torque pressure with drive pressure when synchronization is completed.

In such a hydraulic control system, each valve is provided with a solenoid valve which is duty-controlled so as to operate the damper clutch, vary line pressure, and supply torque pressure when initially shifting.

However, during the duty control of the solenoid valves for controlling the shift operation, fluid is drained through the solenoid valves, such that a stable level of pressure cannot be maintained. That is, it is difficult to stabilize the hydraulic pressure due to fluid loss, resulting in shift shock.

SUMMARY OF THE INVENTION

For the forgoing reason, there is a need for a hydraulic control system which can prevent a drop in pressure when controlling the shift operation to eliminate shift shock.

According to the present invention, a hydraulic control system for an automatic transmission used in a vehicle, said hydraulic control system comprising pressure regulating means for regulating hydraulic pressure generated from a hydraulic pump to constant line pressure; a manual valve selectively supplying hydraulic pressure to a drive pressure passage, a reverse pressure passage, a second speed pressure passage, or a first speed pressure passage; pressure control means for supplying standard pressure to solenoid valves which are duty-controlled or on/off controlled by a transmission control unit, said pressure control means having a solenoid supply valve; damper clutch control means for controlling a damper clutch of a torque converter; pressure distributing means for distributing an appropriate amount of pressure to friction members, said pressure distributing means having shift valves and clutch valves; torque pressure generating means for reducing the line pressure so that the line pressure can be used for initial shifting control; and pressure compensating means for compensating hydraulic pressure by elastically storing the standard pressure when the hydraulic pressure fed to the torque pressure generating means, the pressure regulating means, and the damper clutch control means is reduced, said pressure compensating means being connected to the pressure control means.

Said pressure compensating means comprises a piston on which standard pressure supplied from the solenoid valve acts, and an elastic member biasing the piston against the standard pressure.

BRIEF DESCRIPTION OF THE INVENTION

The above object, and other features and advantages of the present invention will become more apparent by describing in detail preferred embodiments thereof with reference to the attached drawings, in which.

DETAILED DESCRIPTION OF PREFERRED EMBODIMENT

Figure 1:
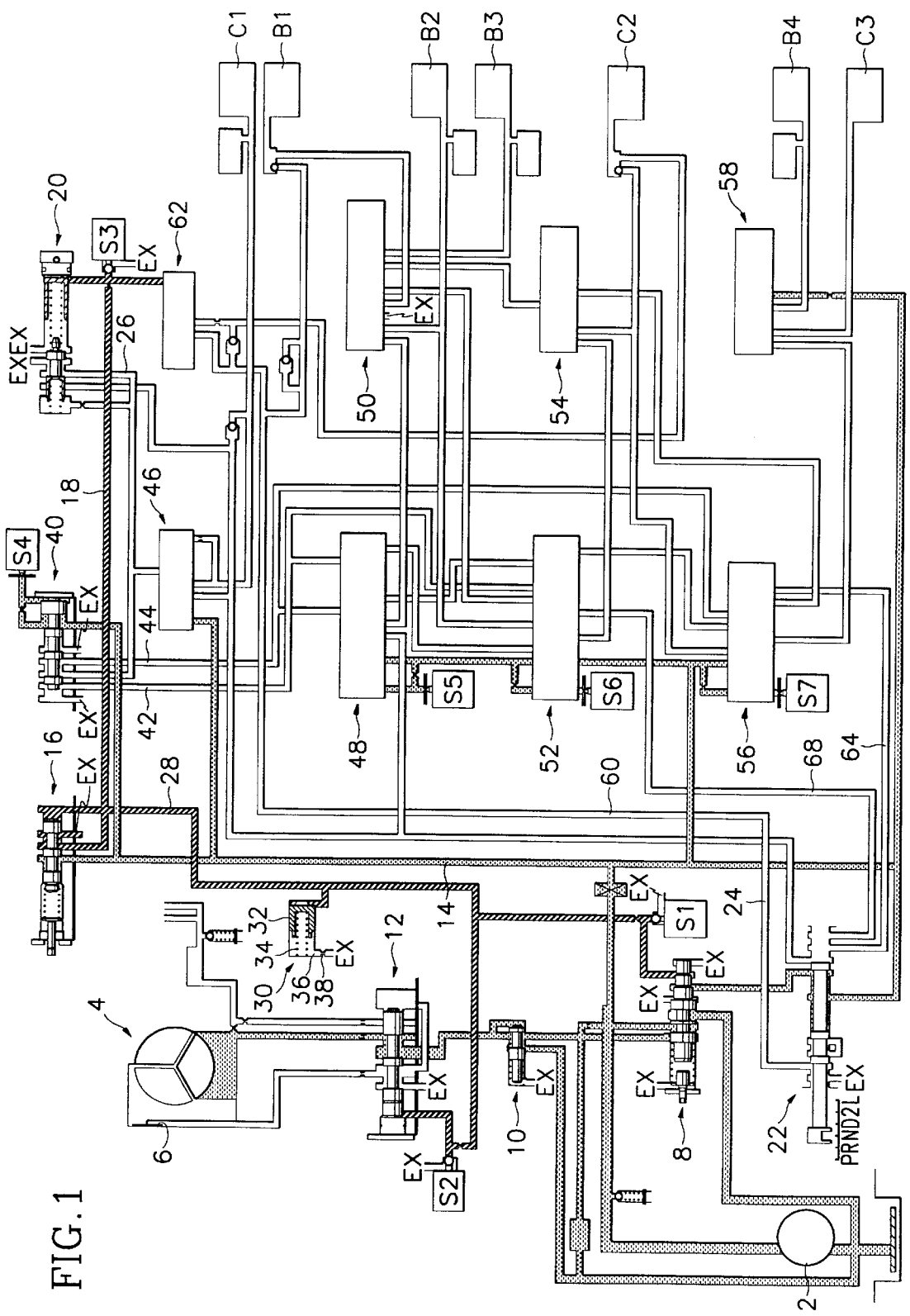
FIG. 1 is a hydraulic circuit diagram illustrating a hydraulic control system according to a preferred embodiment of the present invention.

In the following detailed description, only the preferred embodiment of the invention has been shown and described, simply by way of illustration of the best mode contemplated by the inventor of carrying out the invention. As will be realized, the invention is capable of modification in various obvious respects, all without departing from the invention. Accordingly, the drawing and description are to be regarded as illustrative in nature, and not as restrictive.

Referring first to FIG. 1, there is shown a hydraulic circuit diagram illustrating a hydraulic control system according to a preferred embodiment.

The inventive hydraulic control system comprises a hydraulic pump 2 generating hydraulic pressure by being driven mechanically by an engine, a torque converter 4 for transmitting power of the engine to an input shaft, a damper clutch 6 installed in the torque converter 4 so as to improve power transmission efficiency, a pressure regulating valve 8 for regulating hydraulic pressure generated by the hydraulic pump 8 in accordance with vehicle's running state, a converter feed valve 10 for feeding hydraulic pressure passing through the pressure regulating valve 8 to the torque converter 4 as torque converter operating pressure and lubricating fluid, and a converter clutch control valve 12 for controlling an operation of the damper clutch 6.

The pressure regulating valve 8 is designed to vary its ports in accordance with an operation of a first solenoid valve S1 which is duty-controlled by a transmission control unit (TCU), while the converter clutch control valve 12 is designed to vary its ports in accordance with an operation of a second solenoid valve S2 which is duty-controlled by the TCU.

The pressure regulating valve 8 is connected to a solenoid supply valve 16 through a line pressure passage 14 so as to feed hydraulic pressure thereto. The hydraulic pressure passing through the solenoid supply valve 16 is directed to the first and second solenoid valves S1 and S2 and is fed to the third solenoid valve S3 through a passage 18.

The third solenoid valve S3 controls a port variation of a torque control regulating valve 20. The torque control regulating valve 20 is, when a manual valve is moved toward a drive "D" position, supplied with drive pressure from the manual valve 22 through a drive pressure passage 24. The drive pressure supplied to the torque control regulating valve 20 is directed to a torque pressure passage 26 in accordance with a duty control of the third solenoid valve S3.

Hydraulic pressure which is changed into standard pressure in the solenoid supply valve 16 and flows along passage 28 is directed to the pressure regulating valve 8 and the converter clutch regulating valve 12. Mounted on the passage 28 is a pressure compensator such as an accumulator valve 30. The accumulator valve 30 comprises a valve body 36, a piston 32 movably disposed within the valve body 36, and an elastic member 34 disposed between the piston 32 and a valve body 36. An orifice passage 38 is provided on the valve body 36 so as to stabilize valve operating pressure when the piston 32 moves.

The torque pressure fed to the control switch valve 40 through the torque pressure passage 18 is alternately directed to a first torque pressure passage 42 and a second torque pressure passage 44. This can be enabled by an ON/OFF operation of a fourth solenoid valve S4 which is controlled by the TCU. A passage is branched off from the torque pressure passage 28 so that the line pressure can act on a left port (in the drawing) of an N-D control valve, whereby torque pressure is initially fed to a friction member C1 when shifting from a neutral range to a drive range.

A first shift valve 48 which is selectively supplied with torque pressure from the first and second torque pressure passages 42 and 44 directs the torque pressure to a first clutch valve 50. The torque pressure directed to the first clutch valve 50 is fed to a friction member B2.

The N-D control valve 46 is designed to replace the torque pressure with drive pressure by feeding the torque pressure to a right port thereof, and the first shift valve 48 is controlled by a fifth solenoid valve S5 so as to replace the torque pressure with the drive pressure.

The fifth solenoid valve S5 is operated such that the line pressure being fed from the line pressure passage 14 can act on the first shift valve 48 or can be drained so that it can not act on the first shift valve 48.

A second shift valve 52, to which torque pressure from the first shift valve 48 and torque pressure or drive pressure from the first clutch valve 50 are supplied, is connected to a second clutch valve 54 to supply hydraulic pressure to a friction member C2 in the same manner that the first shift valve 48 supplies hydraulic pressure to the first clutch valve 50.

The second shift valve 52 is designed to vary its ports by an operation of a sixth solenoid valve S6.

A third shift valve 56 is designed to be supplied with torque pressure from the second shift valve 52 and to be supplied with torque pressure or drive pressure from the second clutch valve clutch valve 54. Hydraulic pressure fed to the third shift valve 56 is directed to a friction member C3.

The third shift valve 56 varies its ports by hydraulic pressure fed from the line pressure passage 14 in accordance with an operation of a seventh solenoid valve S7 to direct torque pressure or drive pressure to the friction member C3.

A passage branched from the line pressure passage 14 is connected to the third clutch valve 58 so as to supply line pressure thereto, thereby applying a friction member B4. In a reverse "R" range, reverse pressure is fed to a friction member B1 through a passage 60 and to the friction member C2 through an N-R control valve 62.

When the manual valve 22 is displaced to a second "2" range, drive pressure flowing along a second speed passage 64 is directed to the first clutch 50 through the third shift valve.56 and the second clutch valve 54 and is then directed to a friction member B3.

When the manual valve 22 is displaced to a low "L" range, drive pressure flowing along a first speed passage 68 is directed to the friction member B1 through the second shift valve 52 and the first clutch valve 50.

In the above described hydraulic control system, hydraulic pressure generated by the hydraulic pump 2 is constantly regulated as the first solenoid valve S1 is duty-controlled, thereby becoming line pressure.

A portion of the line pressure is directed to the manual valve 22 along the line pressure passage 14, and a portion of the line pressure is directed to the solenoid supply valve 16 and becomes standard pressure while leaving the solenoid supply valve 16. The standard pressure is directed to the first, second and third solenoid valves S1, S2 and S3 and is then used as control pressure.

A portion of the line pressure flowing along the line pressure passage 14 is directed to the friction member B4 through the third clutch valve 58 along the passage branched off from the line pressure passage 14. A portion of the line pressure flowing along the line pressure passage 14 is directed to the N-D control valve 46 so as to displace a valve spool thereof.

In this state, when the manual valve 22 is displaced to the drive "D" range, the line pressure is directed to the N-D control valve 46 along the drive pressure passage 24 and stands by thereon. A portion of drive pressure is fed to the torque control regulating valve 20, the drive pressure being replaced with torque pressure as the third solenoid valve S3 is duty-controlled, and then directed to the torque pressure passage 26.

The torque pressure directed to the torque pressure passage 26 is fed to the control switch valve 40 and is then directed to the first torque pressure passage 42 or the second torque pressure passage 44 in accordance with the operation of the duty-controlled fourth solenoid valve S4. The torque pressure is then directed to each clutch valve through each shift valve and applied to friction members for each speed ratio.

During the above described operation, when duty-controlling the first, second and third solenoid valves S1, S2 and S3, if duty ratio increases, since the amount of fluid exit also increases, a drop in pressure occurs at the passages due to the shortage of fluid.

Figure 2A:
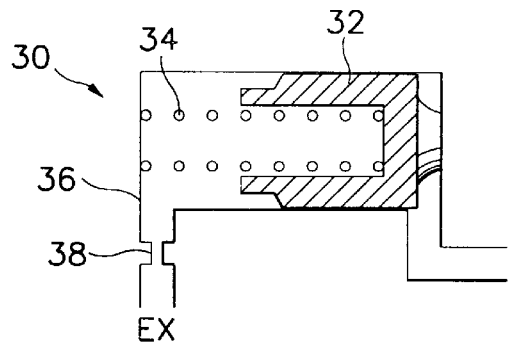
FIG. 2A is a hydraulic compensating device depicted in FIG. 1 before the device is operated.
Figure 2B:
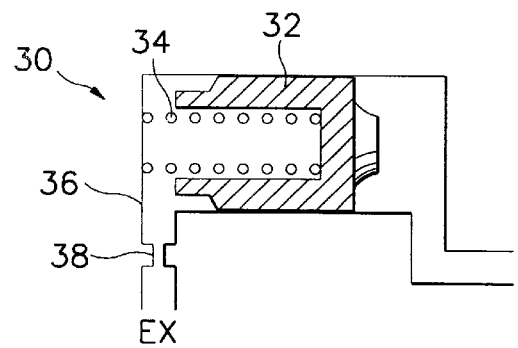
FIG. 2B is a hydraulic compensating device depicted in FIG. 1 after the device is operated.

The drop in pressure is compensated by the accumulator valve 30 which is the pressure compensating means. That is, when the accumulator valve 30 is supplied with hydraulic pressure from the solenoid supply valve 16 through a port P in a state as shown in FIG. 2A, a piston 32 is replaced toward the left in the drawing while overcoming biasing force of the elastic member 34, thereby resulting in a state as shown in FIG. 2B.

Therefore, the accumulator valve 30 elastically stores hydraulic pressure fed from the solenoid supply valve 16. This state is maintained until hydraulic pressure within each passage is reduced due to fluid shortage.

However, as described above, when fluid within each passage is drained while the solenoid valves are duty-controlled, since the hydraulic pressure is reduced within the passage, the elastic member 34 biases the piston 32 toward the right, whereby hydraulic pressure stored in the accumulator valve 30 is directed to the passage.

Figure 3:
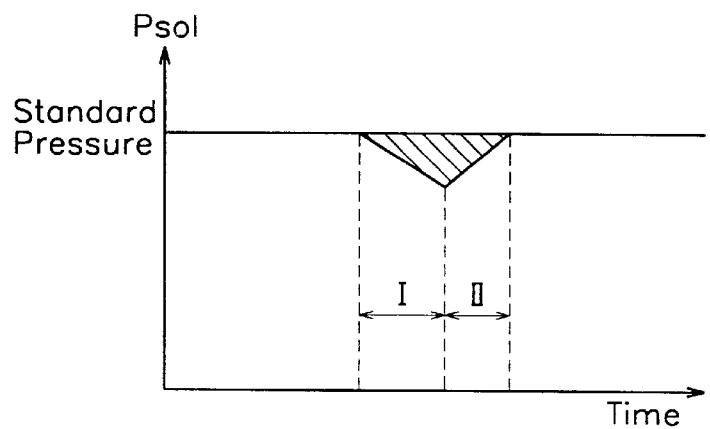
FIG. 3 is a graph illustrating a pressure compensating state after a drop in pressure.

By this operation, the drop in pressure in the passage is increased again as shown in FIG. 3, thereby preventing shift shock caused by the drop in pressure.

In FIG. 3, section I indicates where hydraulic pressure is reduced when the solenoid valve is operated, while section II indicates where hydraulic pressure is increased again by the accumulator.

While this invention has been described in connection with what is presently considered to be the most practical and preferred embodiments, it is to be understood that the invention is not limited to the disclosed embodiment, but, on the contrary, is intended to cover various modification and equivalent arrangements and methods included within the spirit and scope of the appended claims.

What is claimed is:

1. A hydraulic control system for an automatic transmission used in a vehicle, said hydraulic control system comprising:

pressure regulating means for regulating hydraulic pressure generated from a hydraulic pump to constant line pressure;

a manual valve selectively supplying hydraulic pressure to a drive pressure passage, a reverse pressure passage, a second speed pressure passage, or a first speed pressure passage;

pressure control means for supplying standard pressure to solenoid valves which are duty-controlled or on/off controlled by a transmission control unit, said pressure control means having a solenoid supply valve;

damper clutch control means for controlling a damper clutch of a torque converter;

pressure distributing means for distributing an appropriate amount of pressure to friction members, said pressure distributing means having shift valves and clutch valves;

torque pressure generating means for reducing the line pressure so that the line pressure can be used for initial shifting control; and pressure compensating means for compensating hydraulic pressure by elastically storing the standard pressure when the hydraulic pressure fed to the torque pressure generating means, the pressure regulating means, and the damper clutch control means is reduced, said pressure compensating means being connected to the pressure control means.

2. A hydraulic control system according to claim 1, wherein said pressure compensating means comprises a valve having a piston on which standard pressure supplied from the solenoid valve acts, and an elastic member biasing the piston against the standard pressure.

3. A hydraulic control system according to claim 2, wherein the valve body is provided with a port connected to a standard pressure passage communicating with the solenoid supply valve and an exhaust port for exhausting hydraulic pressure.

4. A hydraulic control system according to claim 3, wherein the exhaust port is provided with an orifice for stabilizing valve operating pressure.

\* \* \* \* \*